United States Patent [19]

Braglia et al.

[11] Patent Number: 5,271,082

[45] Date of Patent: Dec. 14, 1993

[54] METHOD OF FABRICATING INTEGRATED OPTICAL GUIDES OF GLASS

[75] Inventors: Marco Braglia, Turin; Giuseppe Cocito, S. Giusto Can.Se (TO); Roberto De Franceschi, Vinovo, all of Italy

[73] Assignee: CSELT - Centro Studi e Laboratori Telecomunicazioni S.p.A., Turin, Italy

[21] Appl. No.: 842,552

[22] Filed: Feb. 27, 1992

[30] Foreign Application Priority Data

Feb. 27, 1991 [IT] Italy .................. TO91 A 000136

[51] Int. Cl.⁵ .................................................. G02B 6/10
[52] U.S. Cl. .................................... 385/129; 385/132; 385/142; 65/3.14; 65/30.13
[58] Field of Search ................ 65/3.11, 3.12, 3.13, 65/3.14, 3.15, 4.2, 4.21, 17; 385/129, 130, 132, 142

[56] References Cited

U.S. PATENT DOCUMENTS

| | | | |
|---|---|---|---|
| 3,880,630 | 4/1975 | Izawa | 65/3.14 X |
| 4,510,344 | 4/1985 | Berman | 65/31 X |
| 4,983,255 | 1/1991 | Gruenwald et al. | 65/31 X |
| 5,035,734 | 7/1991 | Honkanen et al. | 65/30.13 |

OTHER PUBLICATIONS

Waveguide Fabrication for Integrated Optics by Electron Beam Irradiat of Silica, Barbier et al. pp. 715-720, vol. 9, No. 6, Jun. 1991, IEEE Electronics Letters Feb. 28, 1991, vol. 27, No. 5, J. Bell et al., pp. 448-450, "Channel Optical Waveguides Directly Written In Glass With An Electron Beam".

Applied Physics Letters, vol. 57, No. 27, Dec. 31, 1990, pp. 2902-2903, Madden et al., "Optical Channel Waveguide Fabrication . . . ".

Primary Examiner—Frank Gonzalez
Attorney, Agent, or Firm—Herbert Dubno

[57] ABSTRACT

Refractive index change in a glass substrate, necessary to obtain a guiding region, is obtained by bombarding the substrate surface with an electron beam. An electric field induced by negative charge accumulation is created under the surface, whereby sodium ions present in glass are made to migrate towards the inside of the substrate.

4 Claims, 1 Drawing Sheet

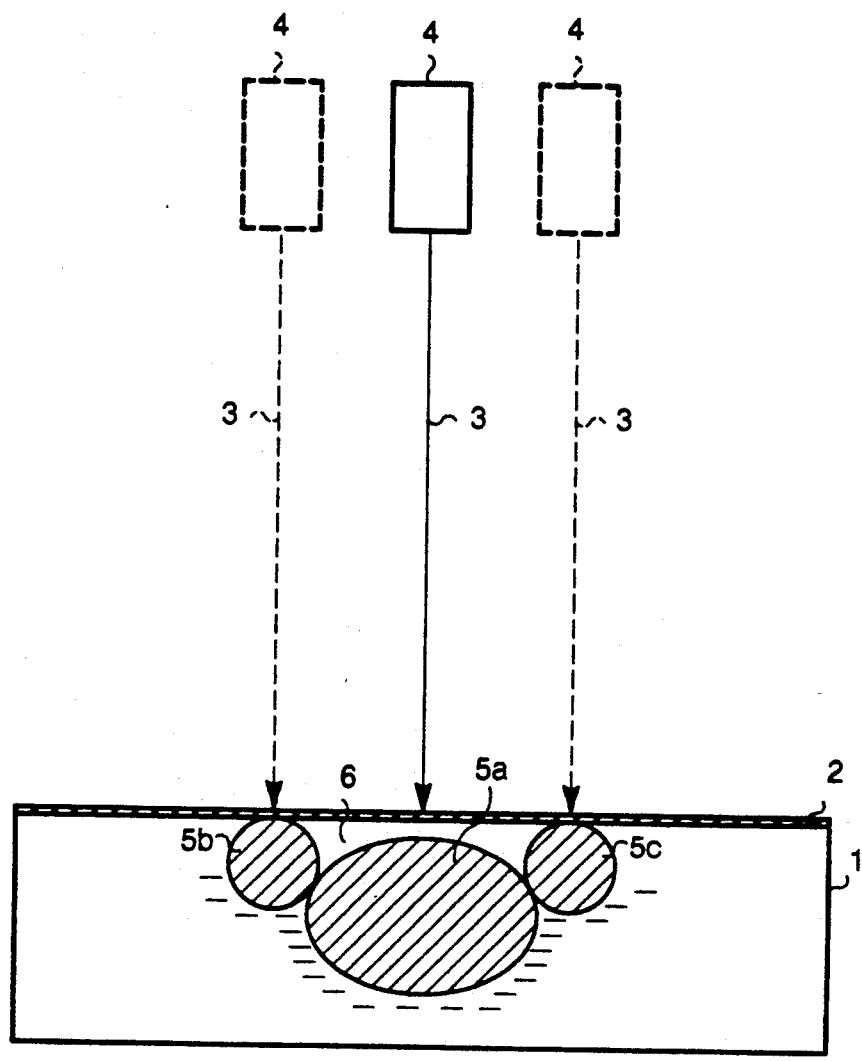

METHOD OF FABRICATING INTEGRATED OPTICAL GUIDES OF GLASS

FIELD OF THE INVENTION

The present invention relates to integrated optical guides and, more particularly, to a method of fabricating planar optical guides of glass.

BACKGROUND OF THE INVENTION

Integrated optical guides of glass are interesting for fabricating different types of integrated optical components, since they have reduced attenuation, are compatible with commercially available optical fibers and can be produced at relatively low cost.

The most widely used technique for fabricating such guides is ion exchange, thanks to its simplicity and to the flexibility allowed in the choice of size and geometric characteristics of the resulting guide. Exchange takes place between $Na^+$ ions, always present in ordinary glasses such as soda-lime and boro-silicate glasses, and other monovalent ions such as $Li^+$, $Cs^+$, $Rb^+$, $Ti^+$ and more usually $K^+$ and $Ag^+$: owing to the smaller size (e.g. of $Li^+$ ions) or the higher electronic polarizability (all others of the above mentioned ions) as compared to $Na^+$ ions, a refractive index increase is obtained in the regions involved in the exchange and these regions can thus exert a guiding action on the light radiation launched into them.

Generally ion exchange is performed by using molten salts of the concerned elements, as described in the papers "Glass waveguides by ion exchange: a review" by T. Findakly, Optical Engineering, Vol. 24, No. 2, March-April 1985, pages 244 to 250 and "Ion-Exchanged Glass Waveguides. A Review", by R. V. Ramaswamy and R. Srivastava, Journal of Lightwave Technology, Vol. 6, No. 6, June 1988, pages 984–1001. These methods suffer from some disadvantages. First, they require a series of complex operations prior to contacting the substrate with the molten salts, since masking of the area where the exchange is not to occur is necessary. This operation is rather long, chiefly if the guide geometry is complex. Secondly, all process parameters (glass composition, nature and concentration of the exchanging ions, temperature, duration, material purity, external electric field etc.) have to be carefully controlled in order to obtain guides with the desired characteristics, since the tefractive index depends in a complex way on these parameters. Moreover, refractive index variation at the guiding zone boundaries is always rather gradual (even in case of a step refractive index profile) and involves a band whose width cannot be reduced under a certain value.

OBJECT OF THE INVENTION

It is an object of the present invention to provide a process whereby the desired refractive index variations are obtained in a simple manner and with high precision and, moreover, without use of chemical compounds, which intrinsically are somewhat polluting.

SUMMARY OF THE INVENTION

To carry out the invention, the inventors have exploited a phenomenon observed in sodium-oxide containing glasses subjected to electron bombardment, i.e. the breaking of sodium-oxygen links with consequent release of molecular oxygen and sodium ion migration towards the inside of the bombarded sample as a result of the electrical field produced by the accumulation of negative charges under the substrate surface in the bombarded zone. Such a phenomenon has been described by J. L. Lineweaver in the paper "Oxygen Outgassing Caused by Electron Bombardment of Glass", Journal of Applied Physics, Vol. 34, No. 6, June 1963. Yet, the author's interest there is only towards analysis of the phenomenon and the study of the consequences of oxygen release on the maintenance of glass properties and on glass utilizability in cathode-ray tubes. No teaching is given about a possible exploitation of the phenomenon to obtain specific devices. Surprisingly, taking into account that the structure change due to sodium ion migration and to oxygen release causes refractive index variation in the regions where the change takes place, the inventors have devised a method using electron bombardment to obtain inside a glass substrate the refractive index variations necessary to create an optical guide.

A method of fabricating optical waveguides based on electron bombardment has been described by S. J. Madden, M. Green and D. Barbier in the paper "Optical channel waveguide fabrication based on electron beam irradiation of silica", Applied Physics Letters, Vol. 57 (27), Dec. 31, 1990. However, in this paper the bombardment is used to cause compaction in a vitreous silica matrix, which does not contain sodium ions, and hence guide fabrication exploits a different phenomenon from the one whereupon this invention is based.

The invention provides a method of fabricating optical guides on a substrate by bombarding the substrate surface with an electron beam, wherein the substrate is a glass substrate containing sodium oxide and the electron beam is moved step by step over such a surface so as to describe three parallel trajectories along a path corresponding to the shape of the guide to be obtained, thereby creating in the zones subjected to the bombardment a region, extending along the whole beam path, where a sodium ion migration occurs towards the inside of the substrate, the bombardment along the individual trajectories being carried out with such an energy and for such a time that said region comprises the substrate surface in correspondence with the lateral trajectories and lies entirely inside the substrate in correspondence with the central trajectory.

Sodium ion migration towards the inside of the substrate and oxygen release create, in the region involved, a lower-density structure, which will have a lower refractive index than the non-bombarded region. For this reason it is necessary to displace the electron beam according to three parallel trajectories, so as to leave, in correspondence with the central trajectory, a surface region left unchanged by the bombardment, which region consequently has higher refractive index and forms the guiding region, while the region involved in the exchange forms the guide confinement region.

A process of this kind is intrinsically simple and clean. Besides, owing to the ease by which an electron beam can be deflected, it is possible to obtain without difficulty guides with a very complicated geometric shape. Further, the use of an electron beam allows a precise delimitation of the regions involved by refractive index change and hence the obtention of a high lateral resolution.

Preferably, in order that the region involved in ion migration has the precise configuration above, the bombardment along the central trajectory is carried out with greater energy than along the lateral trajectories. Bombardment duration at each step of beam displacement is substantially the same for the three trajectories and is the duration allowing an equilibrium condition to be attained in correspondence with the lateral trajectories.

In this way, in correspondence with the central trajectory, electrons penetrate into the substrate to a greater depth than in correspondence with the lateral trajectories. During the time necessary to attain the equilibrium condition in correspondence with said lateral trajectories, ion migration in correspondence with the central trajectory will have involved only the substrate layers closest to the zone where negative charge has been accumulated, and not the superficial layers.

In this embodiment of the invention, acceleration potentials of the order of 30-35 kV can be used for the bombardment along the central trajectory and of 20-25 kV for the two lateral trajectories. By these values the region involved in the ion exchange extends down to a depth of 18-22 $\mu$m for higher energy bombardment and to 6-7 $\mu$m for lower energy bombardment.

The time necessary to attain the above mentioned equilibrium condition depends on the bombardment current intensity, and will be the lower the higher the intensity. However, the intensity should be such as to ensure in the bombarded zone a current density exceeding a certain minimum value (of the order of $10-9$ A/$\mu$m$^2$), under which no negative charge accumulation occurs inside the sample. The actual intensity to be used is determined each time taking into account also the length of the guide to be fabricated, so as to obtain total times compatible with industrial scale fabrication. If necessary, more scannings along each of the parallel trajectories can be carried out.

A problem which can be encountered with electron bombardment is that of electron accumulation on the glass surface, which could hinder penetration and hence charge accumulation. This can be avoided by coating the sample surface prior to bombardment, with a layer of conducting material which is easy to remove, such as: Ti and Au deposited in two superposed layers, Ni or generally any metal. The metal layer can be deposited with any suitable techniques vapor deposition, sputtering) and will then be removed, once the operations of guide fabrication are over, e.g. by chemical methods, using convenient acids and oxidisers. A coating operation of this kind, which involves the total sample surface, is simpler and quicker than forming a mask of given geometry, as required by the known technique.

BRIEF DESCRIPTION OF THE DRAWING

The sole FIGURE of the accompanying drawing is a sectional view illustrating guide fabrication.

SPECIFIC DESCRIPTION

In the drawing, numeral 1 denotes the glass substrate where the guide is to be obtained, the substrate being covered with a layer of conducting material 2. Substrate 1 is bombarded with an electron beam 3 emitted by a source 4 mounted on a support (not shown) which allows the displacements necessary to describe the parallel trajectories as mentioned above. Since the source is completely conventional, a detailed description is unnecessary. The beam and the source are represented in solid line in the position corresponding to the central trajectory and, in phantom lines, corresponding to the two lateral trajectories. The zones involved in sodium ion migration are indicated by dashed areas 5a for the central trajectory and 5b, 5c for lateral trajectories. As shown, the three zones 5a, 5b, 5c are mutually in contact. Zone 5a lies at a certain depth, while lateral zones 5b, 5c extend up to the substrate surface. In this way zones 5a, 5b, 5c delimit and isolate from the rest of the substrate 1 a zone 6 which has not been involved in Na$^+$ ion migration and extends up to the substrate surface. Zone 6 thus forms the guiding region, while all of the three zones 5a to 5c form the confinement region.

It is clear that what described has been given only by way of non-limiting example, and variations and modifications are possible. More particularly, instead of keeping the bombardment time in the three trajectories constant and using a lower-energy beam for the two lateral trajectories, zones 5b, 5c can be created by using a beam having the same energy as used for the central trajectory and by decreasing the bombardment duration or the current intensity.

We claim:

1. A method of fabricating an integrated optical guide on a substrate which comprises the steps of:
   bombarding the surface of a substrate of a glass containing sodium oxide with an electron beam; and
   displacing the electron beam step by step over said surface so as to describe three parallel trajectories according to a patch corresponding to the shape of a guide to be obtained and creating in zones subjected to bombarding a region which extends along an entire path of the beam resulting in a sodium ion migration towards the interior of the substrate and over and within said region, the bombardment along the various trajectories being made with such an energy and for such a time that said region comprises the substrate surface in correspondence with the lateral trajectories and lies entirely inside the substrate in correspondence with the central trajectory, the bombardment along the central trajectory being effected with higher energy than along the lateral trajectories and bombardment time is constant for each displacement step of the electron beam along each trajectory.

2. A method of fabricating an integrated optical guide on a substrate which comprises the steps of:
   bombarding the surface of a substrate of a glass containing sodium oxide with an electron beam; and
   displacing the electron beam step by step over said surface so as to describe three parallel trajectories according to a path corresponding to the shape of a guide to be obtained and creating zones subjected to bombarding a region which extends along an entire path of the beam resulting in a sodium ion migration towards the interior of the substrate and over and within said region, the bombardment along the various trajectories being made with such an energy and for such a time that said region comprises the substrate surface in correspondence with the lateral trajectories and lies entirely inside the substrate in correspondence with the central trajectory, the bombardment being carried out with the same energy for all the three trajectories, and for a shorter time for each displacement step along the lateral trajectories.

3. A method of fabricating an integrated optical guide on a substrate which comprises the steps of:
   bombarding the surface of a substrate of a glass containing sodium oxide with an electron beam; and displacing the electron beam step by step over said surface so as to describe three parallel trajectories according to a path corresponding to the shape of a guide to be obtained and creating in zones subjected to bombarding a region which extends along an entire path of the beam resulting in a sodium ion migration towards the interior of the substrate and over and within said region, the bombardment along the various trajectories being made with such an energy and for such a time that said region comprises the substrate surface in correspondence with the lateral trajectories and lies entirely inside the substrate in correspondence with the central trajectory, prior to the bombardment the surface of the substrate being coated with a conducting material, which is removed after the bombardment.

4. A method of fabricating an integrated optical guide on a substrate which comprises the steps of:

bombarding the surface of a substrate of a glass containing sodium oxide with an electron beam; and displacing the electron beam step by step over said surface so as to describe three parallel trajectories according to a path corresponding to the shape of a guide to be obtained and creating in zones subjected to bombarding a region which extends along an entire path of the beam resulting in a sodium ion migration towards the interior of the substrate and over and within said region, the bombardment along the various trajectories being made with such an energy and for such a time that said region comprises the substrate surface in correspondence with the lateral trajectories and lies entirely inside the substrate in correspondence with the central trajectory, the bombardment being carried out with the same energy for all the three trajectories and with lower current intensity for each displacement step along the lateral trajectories.

* * * * *